US009806752B2

(12) United States Patent
Xia et al.

(10) Patent No.: US 9,806,752 B2
(45) Date of Patent: Oct. 31, 2017

(54) ELECTRONIC DEVICE AND INFORMATION PROCESSING METHOD

(71) Applicants: Beijing Lenovo Software Ltd., Beijing (CN); Lenovo (Beijing) Limited, Beijing (CN)

(72) Inventors: Jie Xia, Beijing (CN); Ge Gao, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/982,398

(22) Filed: Dec. 29, 2015

(65) Prior Publication Data
US 2017/0093450 A1   Mar. 30, 2017

(30) Foreign Application Priority Data

Sep. 30, 2015   (CN) .......................... 2015 1 0643030

(51) Int. Cl.
| | | |
|---|---|---|
| H04B 1/38 | (2015.01) | |
| H04B 1/3827 | (2015.01) | |
| H04W 76/02 | (2009.01) | |
| H04M 1/02 | (2006.01) | |
| G06F 3/041 | (2006.01) | |
| G06F 1/32 | (2006.01) | |
| H04R 3/12 | (2006.01) | |

(52) U.S. Cl.
CPC ........... *H04B 1/385* (2013.01); *G06F 1/3265* (2013.01); *G06F 3/0416* (2013.01); *H04M 1/0202* (2013.01); *H04R 3/12* (2013.01); *H04W 76/023* (2013.01); *H04R 2499/11* (2013.01)

(58) Field of Classification Search
CPC ... H04B 1/385; H04M 1/0202; H04W 76/023
USPC ........................................................ 455/566
See application file for complete search history.

(56) References Cited

U.S. PATENT DOCUMENTS

| | | | | |
|---|---|---|---|---|
| 8,249,547 B1* | 8/2012 | Fellner | ............... | G08B 21/0446 |
| | | | | 455/404.1 |
| 8,874,448 B1* | 10/2014 | Kauffmann | ............. | G10L 25/78 |
| | | | | 381/107 |
| 9,002,420 B2* | 4/2015 | Pattikonda | .......... | H04M 1/6041 |
| | | | | 455/41.2 |
| 2003/0236100 A1* | 12/2003 | Fujieda | .................... | H04Q 9/04 |
| | | | | 455/550.1 |
| 2005/0009584 A1* | 1/2005 | Park | ....................... | H04B 1/385 |
| | | | | 455/575.6 |

(Continued)

*Primary Examiner* — April G Gonzales
(74) *Attorney, Agent, or Firm* — Schwegman Lundberg & Woessner, P.A.

(57) ABSTRACT

The present disclosure provides an electronic device and an information processing method of providing an electronic device which may be used more conveniently. The electronic device comprises: a main body; a first audio output component arranged on a first outer surface of the main body; a display arranged on a second outer surface of the main body, the first outer surface and the second outer surface being opposite to each other; an audio input component arranged on the main body; a second audio output component arranged on the main body, wherein an attribute parameter of the second audio output component is higher than that of the first audio output component.

18 Claims, 7 Drawing Sheets

(56) References Cited

U.S. PATENT DOCUMENTS

| | | | | |
|---|---|---|---|---|
| 2005/0037823 | A1* | 2/2005 | Seshadri | H04M 1/05 455/575.6 |
| 2007/0232373 | A1* | 10/2007 | Yoshida | G04G 21/04 455/575.6 |
| 2013/0120106 | A1* | 5/2013 | Cauwels | G06F 1/163 340/3.1 |
| 2013/0120459 | A1* | 5/2013 | Dickinson | G06F 1/163 345/650 |
| 2015/0185762 | A1* | 7/2015 | Magi | G06F 1/163 361/679.03 |
| 2015/0201267 | A1* | 7/2015 | Chang | H04R 1/1041 381/74 |
| 2015/0372656 | A1* | 12/2015 | Mow | H03H 7/38 455/77 |

* cited by examiner

ELECTRONIC DEVICE AND INFORMATION PROCESSING METHOD

CROSS-REFERENCE TO RELATED APPLICATION(S)

This application claims priority to the Chinese Patent Application No. 201510643030.9, filed on Sep. 30, 2015, entitled "ELECTRONIC DEVICE AND INFORMATION PROCESSING METHOD", which is incorporated herein by reference in its entirety.

TECHNICAL FIELD

The present disclosure relates to the field of electronic technology, and in particular, to an electronic device and information processing method.

BACKGROUND

With continuous development of science and technology, the electronic technology has also been rapidly developed, there are more and more types of electronic products, and people also enjoy various conveniences brought by the development of the science and technology. Now, people may enjoy a comfortable life brought by various types of electronic devices with the development of the science and technology.

Taking communication devices as an example, most of the conventional communication devices, such as mobile phones or smart watches, have embedded operating systems, and thus allow users to play games, view videos and edit files etc. on the communication devices.

However, there is still a problem with the conventional communication device that it is not convenient for the user in use of the conventional communication device.

SUMMARY

Embodiments of the present disclosure provide an electronic device, and an information processing method of providing an electronic device which can be used more conveniently.

In a first aspect, the present disclosure provides an electronic device, comprising:
a main body;
a first audio output component arranged on a first outer surface of the main body;
a display arranged on a second outer surface of the main body, the first outer surface and the second outer surface being opposite to each other;
an audio input component arranged on the main body;
a second audio output component arranged on the main body, wherein an attribute parameter of the second audio output component is higher than that of the first audio output component.

Alternatively, the electronic device further comprises:
a first sensor, arranged on the main body and configured to detect a posture of the main body;
a communication component, arranged on the main body and configured to communicate with other electronic devices;
a processor, arranged on the main body and connected to the first sensor, the communication component, the first audio output component, the display, the audio input component and the second audio output component, the processor being configured to determine whether the posture of the main body is switched from a first posture of the main body to a second posture of the main body which is different from the first posture of the main body; and to switch the electronic device from a first communication state to a second communication state which is different from the first communication state, if the posture of the main body is switched from the first posture of the main body to the second posture of the main body.

Alternatively, the first communication state and the second communication state are any two of a Communication Connected state, a Not-In-Communication state and a Communication Requesting state; or
the first communication state and the second communication state are any two of a Low Power Consumption Communication Requesting state, a High Power Consumption Communication Requesting state, a High Power Consumption Communication Connected state, a Low Power Consumption Communication Connected state and a Not-In-Communication state.

Alternatively, the postures of the main body comprise a maintaining posture and a non-maintaining posture which is different from the maintaining posture; and when the main body is in the maintaining posture, the main body maintains a relative position relationship of the electronic device with respect to at least a part of a user's body, and the main body can be at least a part of an annular space or at least a part of an approximately annular space which satisfies a first predetermined condition.

Alternatively, the processor is configured to switch between communication connected/disconnected states, if the posture of the main body is switched from the first posture of the main body to the second posture of the main body.

Alternatively, the second communication state is a High Power Consumption Communication Connected state; and the High Power Consumption Communication Connected state is a state in which a voice input of a first communication party is collected by the audio input component and voices from said other electronic devices is output by the second audio output component.

Alternatively, the processor is configured to switch the electronic device from a Communication Requesting state to a Low Power Consumption Communication Connected state; and the Low Power Consumption Communication Connected state is a state in which a voice input of a first communication party is collected by the audio input component and voices from said other electronic devices are output by the first audio output component; wherein the first posture of the main body is a maintaining posture, and the second posture of the main body is a non-maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition; and the display is further configured to output a communication requesting prompt when the electronic device is in the Communication Requesting state.

Alternatively, the processor is configured to switch the electronic device from a Low Power Consumption Communication Connected state to a Not-In-Communication state; and the Low Power Consumption Communication Connected state is a state in which a voice input of a first communication party is collected by the audio input component and voices from said other electronic devices are output by the first audio output component; wherein the first posture of the main body is a non-maintaining posture, and the second posture of the main body is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition.

Alternatively, the electronic device further comprises:

a second sensor arranged on the main body and connected to the processor, the second sensor being configured to detect a first operation which satisfies a first predetermined condition; and wherein the processor is configured to switch the electronic device from the Low Power Consumption Communication Connected state to the High Power Consumption Communication Connected state, if the second sensor detects the first operation; wherein the first posture of the main body is a non-maintaining posture, and the second posture of the main body is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition.

Alternatively, the processor is configured to switch the electronic device from the Communication Requesting state to the High Power Consumption Communication Connected state; wherein the first posture of the main body is a non-maintaining posture, and the second posture of the main body is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition; and the display is further configured to output a communication requesting prompt when the electronic device is in the Communication Requesting state.

Alternatively, the display can be switched from a posture matched with the first posture of the main body to a posture matched with the second posture of the main body, if the posture of the main body is switched from the first posture of the main body to the second posture of the main body.

In a second aspect, the present disclosure provides an information processing method, comprising:

detecting a posture of a main body of an electronic device;

determining whether the posture of the main body is switched from a first posture of the main body to a second posture of the main body which is different from the first posture of the main body; and switching the electronic device from a first communication state to a second communication state which is different from the first communication state, if the posture of the main body is switched from the first posture of the main body to the second posture of the main body.

Alternatively, switching the electronic device from the first communication state to the second communication state which is different from the first communication state if the posture of the main body is switched from the first posture of the main body to the second posture of the main body comprises:

switching between Communication Connected/Disconnected states, if the posture of the main body is switched from the first posture of the main body to the second posture of the main body.

Alternatively, the second communication state is a High Power Consumption Communication Connected state; and the High Power Consumption Communication Connected state is a state in which a voice input of a first communication party is collected by the audio input component and voices from other electronic devices are output by the second audio output component.

Alternatively, switching between the Communication Connected/Disconnected states comprises:

switching the electronic device from a Communication Requesting state to a Low Power Consumption Communication Connected state; and the Low Power Consumption Communication Connected state is a state in which a voice input of a first communication party is collected by the audio input component and voices from other electronic devices are output by the first audio output component; wherein the first posture of the main body is a maintaining posture, and the second posture of the main body is a non-maintaining posture;

wherein the postures of the main body comprise the maintaining posture and the non-maintaining posture; and when the main body is in the maintaining posture, the main body maintains a relative position relationship of the electronic device with respect to at least a part of a user's body, and the main body can be at least a part of an annular space or at least a part of an approximately annular space which satisfies a first predetermined condition; and wherein a communication requesting prompt is output when the electronic device is in the Communication Requesting state.

Alternatively, switching between the Communication Connected/Disconnected states comprises:

switching the electronic device from a Low Power Consumption Communication Connected state to a Not-In-Communication state; and the Low Power Consumption Communication Connected state is a state in which a voice input of a first communication party is collected by the audio input component and voices from other electronic devices are output by the first audio output component; wherein the first posture of the main body is a non-maintaining posture, and the second posture of the main body is a maintaining posture; and wherein the postures of the main body comprise the maintaining posture and the non-maintaining posture; and when the main body is in the maintaining posture, the main body maintains a relative position relationship of the electronic device with respect to at least a part of a user's body, and the main body can be at least a part of an annular space or at least a part of an approximately annular space which satisfies a first predetermined condition.

Alternatively, switching the electronic device from the first communication state to the second communication state which is different from the first communication state if the posture of the main body is switched from the first posture of the main body to the second posture of the main body comprises:

determining whether a first operation which satisfies a first predetermined condition is detected;

switching the electronic device from the Low Power Consumption Communication Connected state to the High Power Consumption Communication Connected state, if the first operation is detected; wherein the first posture of the main body is a non-maintaining posture, and the second posture of the main body is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition.

Alternatively, switching the electronic device from the first communication state to the second communication state which is different from the first communication state if the posture of the main body is switched from the first posture of the main body to the second posture of the main body comprises:

switching the electronic device from the Communication Requesting state to the High Power Consumption Communication Connected state; wherein the first posture of the main body is a non-maintaining posture, and the second posture is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition; and outputting a communication requesting prompt when the electronic device is in the Communication Requesting state.

DETAILED DESCRIPTION

Figure 1A:
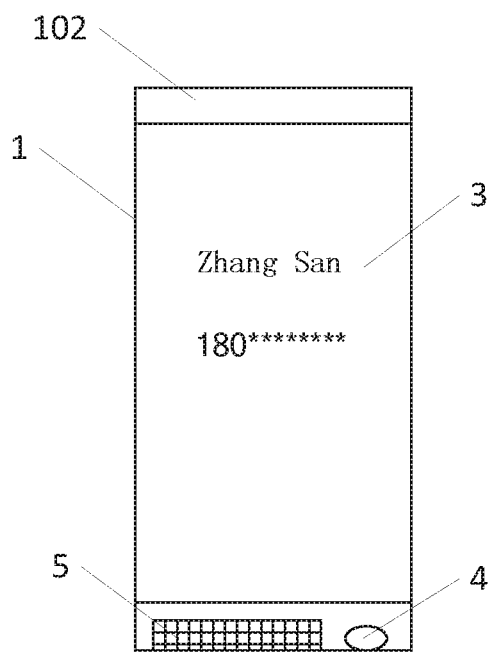
FIGS. 1A-1B are schematic diagrams of electronic devices in non-maintaining postures according to embodiments of the present disclosure.

The embodiments of the present disclosure provide an electronic device and an information processing method, for solving a technical problem in the conventional communication devices that they cannot be used conveniently enough and implementing a technical effect of providing an electronic device which can be used more conveniently.

In the technical solutions according to the embodiments of the present disclosure, the first audio output component of the electronic device is arranged on the first outer surface of the main body, the display is arranged on the second outer surface, the audio input component is arranged on the main body, and a second audio output component with an attribute parameter higher than that of the first audio output component is arranged on the main body, wherein the first outer surface and the second outer surface are outer surfaces opposite to each other.

By respectively arranging the first audio output component and the display on the two opposite outer surfaces, in a first aspect, a display screen of the display may be arranged to be larger in a case that areas of their second outer surfaces are identical. Thus, a screen ratio may be increased, so that the electronic device may present content to a user by a larger display screen.

In a second aspect, when the user holds the electronic device for communication, since the first audio output component is arranged on the first outer surface, the user may communicate on the first outer surface; at the same time, when the display includes a fourth sensor, e.g., a touch sensor, a probability of touching the fourth sensor by mistake during the communication may be further reduced. Therefore, the electronic device provided by the present disclosure is more convenient to be used.

In a third aspect, assuming that the electronic device is placed on a placing plane, the first outer surface is generally used as the placing plane for convenience of the user viewing its display, and thus the display is opposite to the placing plane and faces outward. When the user picks up the electronic device from the placing plane, the second outer surface faces to a palm of the user. Since the first audio output component is arranged on the first outer surface, the user may directly hold the electronic device close to his face and ear and in turn to communicate on the first outer surface without turning the electronic device over or changing his hand to have the second outer surface face toward his face. Therefore, a risk may be reduced that the electronic device may be slid down to be damaged due to its smooth outer surfaces or its larger size when the user turns the electronic device over or changes his hand.

Hereinafter, the technical solutions of the present disclosure will be described in detail in connection with the drawings and particular embodiments. It should be understood that the embodiments of the present disclosure and the specific features in the embodiments are detailed illustration for the technical solutions of the present disclosure, but not limitations thereon. The embodiments of the present disclosure and the specific features in the embodiments may be combined mutually in a case of no confliction.

The term "and/or" here is only an association relationship, representing three relationships. For example, A and/or B may represent three cases: there is only A; there are both A and B; and there is only B. Furthermore, the symbol "/" here generally represents that the associated objects before and after "/" is in an "or" relationship.

A first aspect of the present disclosure provides an electronic device, with reference to FIGS. 1A, 1B, 2 and 3 which respectively show structural schematic diagrams of an electronic device in an embodiment of the present disclosure. The electronic device in the embodiment of the present disclosure may comprise: a main body 1, a first audio output component 2, a display 3, an audio input component 4 and a second audio output component 5.

Specifically, the first audio output component 2 is arranged on a first outer surface 101 of the main body 1, and the display 3 is arranged on a second outer surface 102. In the embodiment of the present disclosure, the first outer surface 101 and the second outer surface 102 are outer surfaces opposite to each other. For example, when the user watches the electronic device, the first outer surface 101 faces to the user's eyes, and the second outer surface 102 is back to the user's eyes; or when the user holds the electronic device, the first outer surface 101 faces to the user's palm, and the second outer surface 102 is back to the palm.

The audio input component 4 is arranged on the main body 1. In the embodiment of the present disclosure, the audio input component 4 may be arranged on the first outer surface 101 or the second outer surface 102, or may be arranged on outer surfaces other than the first outer surface 101 and the second outer surface 102, which are limited in the present disclosure. For example, when the first audio output component 2 is arranged on the first outer surface 101 close to a first end, the audio input component 4 is arranged on the first outer surface 101 close to a second end which is opposite to the first end, or is arranged on the second end, or is arranged on the second outer surface 102 close to the second end.

Of course, it is also possible to arrange the audio input component 4 on an outer surface other than the second outer surface 102 in order to further increase a screen ratio.

The audio input component 4 is configured to collect voice inputs. During the electronic device is communicating with other electronic devices, the audio input component mainly collects a voice of a first communication party. In the embodiment of the present disclosure, the other electronic devices are devices which may communicate with the electronic device, and the first communication party is a communication party who uses the electronic device in the embodiment of the present disclosure.

Further, the electronic device in the embodiment of the present disclosure may further comprise a second audio output device 5. Particularly, the second audio output component 5 is arranged on the main body 1. And in particular implementations, the second audio output component 5 may be arranged on the first outer surface 101, the second outer surface 102 or other outer surfaces of the electronic device, which are not limited here.

Both the first audio output component 2 and the second audio output component 5 may output the voices from the other electronic devices during the electronic device is communicating with the other electronic devices. However, an attribute parameter of the second audio output component 5 is higher than that of the first audio output component 2.

In the embodiment of the present disclosure, the attribute parameter may be a maximum volume, or an input power etc. For example, when the attribute parameter is the maximum volume, the maximum volume of the second audio output component 5 is higher than that of the first audio output component 2. For example, the maximum volume of the first audio output component 2 is 60 dB, and the maximum volume of the second audio output component 5 is 105.4 dB. Alternatively, when the attribute parameter is the input power, the electronic device needs to input, to the second audio output component 5, power higher than that input to the first audio output component 2. For example, the input power of the first audio output component 2 is 34 MW, and the input power of the second audio output component 5 is 1.2 MW. Of course, in particular implementations, the attribute parameter may be set by the skilled in the art according to practical requirements, which is not limited in the present disclosure.

Since the attribute parameter of the second audio output component 5 is higher than that of the first audio output component 2, the volume of voice output from the second audio output component 5 is generally higher than that output from the first audio output component 2. In a particular communication process, the user may select the first audio output component 2 or the second audio output component 5 for outputting the voices from the other electronic devices according to his own requirements.

As seen from the above, the first audio output component 2 and the display 3 are arranged respectively on the opposite outer surfaces. On one hand, in the case that the areas of their second outer surfaces 102 are identical, the display screen of the display 3 may be arranged to be larger on the second outer surface 102 since it is not required to consider arranging the first audio output component 2. Thus, a screen ratio (which is a ratio of a display screen area to an outer surface area for arranging the display screen) may be increased. Therefore, the electronic device may present content to the user by a larger display screen, and the user may also feel more comfortable in viewing content by the larger display screen.

On the other hand, when the user holds the electronic device for communication, since the first audio output component 2 is arranged on the first outer surface 101, the user may communicate by placing the first outer surface 101 close to his face and ear. The display 3 is arranged on the second outer surface 102. Hence, when the display 3 includes a fourth sensor, e.g., a touch sensor, the fourth sensor may not contact the user's face and ear, and thus the probability of touching the fourth sensor by mistake during the communication may be further reduced.

At the same time, when the user picks up, from the placing plane, the electronic device whose first outer face is used as the placing plane, the second outer surface 102 faces to the palm of the user. Since the first audio output component 2 is arranged on the first outer surface, the user may directly hold the electronic device close to his face and ear and in turn to communicate on the first outer surface 101 without turning the electronic device over or changing his hand to have the second outer surface 102 face toward his face and ear. Therefore, a risk may be reduced that the electronic device may be slid down to be damaged due to its smooth outer surfaces or its larger size when the user turns the electronic device over or changes his hand.

The electronic device in the embodiment of the present disclosure reduces the probability of the face and ear touching the fourth sensor by mistake. Further, in order to reduce a probability of a hand touching the fourth sensor by mistake during communication, a processor 8 of the electronic device may be further configured to:

detect a communication state of the electronic device;

disable the detection function of the fourth sensor, or make no response to the detection of the fourth sensor, when it is detected that the electronic device enters a Communication Connected state.

Particularly, the processor 8 disables the detection function of the fourth sensor, e.g., disables a touch detection function of the touch sensor, or makes no response to the detection, e.g., makes no response to a touch detection signal of the touch sensor, after it is detected that the electronic device is connected for communication. As such, the embodiment of the present disclosure may further reduce the probability of the hand touching the fourth sensor by mistake during communication. Moreover, compared with the conventional solution of disabling an input function by an approaching switch arranged on the second outer surface 102, a detection error of the approaching switch may be avoided, power consumption of the approaching switch may be reduced, and accuracy of disabling the input function may be improved.

A first sensor 6 is arranged on the main body 1, and is configured to detect a posture of the main body 1 and transmit the detected posture of the main body to the processor 8.

A communication component 7 is arranged on the main body 1. In the embodiment of the present disclosure, the communication component 7 may be arranged on the outer surface of the main body 1 or inside the main body 1, which is not particularly limited in the present disclosure. The communication component 7 is configured to communicate with other electronic devices, particularly, to establish communication connections, voice chatting connections etc. with the other electronic devices, to transmit/receive signals, and/or to modulate/demodulate signals etc.

Figure 3:
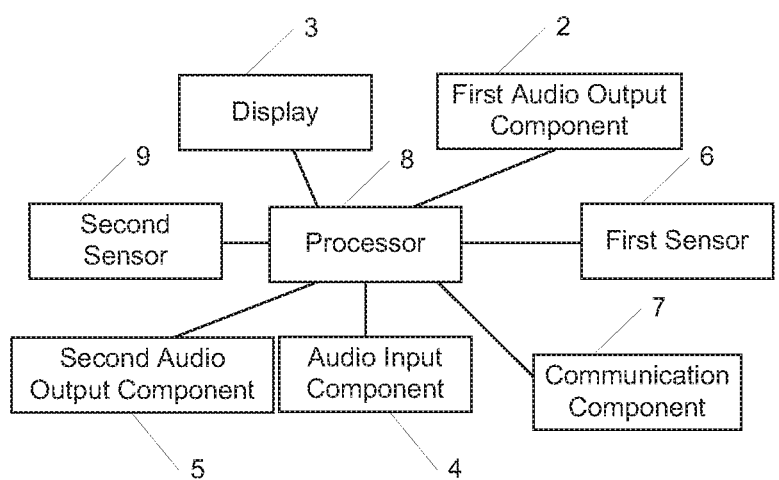
FIG. 3 is a structural schematic diagram of an electronic device according to an embodiment of the present disclosure.

The processor 8 is arranged on the main body 1. Optionally, the processor 8 is arranged inside the main body 1 in order to protect the processor 8 from being damaged. As shown in FIG. 3, the processor 8 is connected to the first sensor 6, the communication component 7, the first audio output component 2, the display 3, the audio input component 4 and the second audio output component 5. In the embodiment of the present disclosure, the processor 8 is configured to determine whether the posture of the main body is switched from a first posture of the main body to a second posture of the main body which is different from the first posture of the main body; and to switch the electronic device from a first communication state to a second communication state which is different from the first communication state, if the posture of the main body is switched from the first posture of the main body to the second posture of the main body.

In particular, the posture of the main body in the embodiment of the present disclosure includes, but not limited to, a bar posture, a posture of being bent at least one time, or a posture of being folded at least one time etc. The communication state includes, but not limited to, a Not-In-Communication state, a Communication Connected state and a Communication Requesting state. The Not-In-Communication state is a state in which the electronic device does not establish a communication connection with any of other electronic devices, e.g., a state after the communication is disconnected, a standby state, or a state after the communication is rejected, etc. The Communication Connected state is a state in which the electronic device establishes the communication connections with the other electronic devices and has information interactions with the other electronic devices, including but not limited to a High Power Consumption Communication Connected state and a Low Power Consumption Communication Connected state. The High Power Consumption Communication Connected state, i.e., a Hand Free state, is a state in which the voice input of the first communication party is collected by the audio input component 4 and the voices from the other electronic devices are output by the second audio output component 5. The Low Power Consumption Communication Connected state, i.e., a Non-Hand Free state, is a state in which the voice input of the first communication party is collected by the audio input component 4 and the voices from the other electronic devices are output by the first audio output component 2. The Communication Requesting state is a state in which the electronic device receives and responds to a communication request from at least one of the other electronic devices, including a High Power Consumption Communication state and a Low Power Consumption Communication state. The High Power Consumption Communication state is a state in which a communication request prompt is output at least by the display 3 and the second audio output component 5 while a communication request is being responded. The Low Power Consumption Communication state is a state in which a communication request prompt is output by the display 3 and/or a vibrator while a communication request is being responded.

The first communication state and the second communication state are any two different states of a plurality of communication states of the electronic device. Particularly, the first communication state and the second communication state are any two of the Communication Connected state, the Not-In-Communication state, and the Communication Requesting state. For example, the first communication state is the Communication Connected state, and the second communication state is the Not-In-Communication state; the first communication state is the Communication Requesting state, and the second communication state is the Not-In-Communication state; or the first communication state is the Communication Requesting state, and the second communication state is the Communication Connected state.

Alternatively, the first communication state and the second communication state are any two of the Low Power Consumption Communication Requesting state, the High Power Consumption Communication Requesting state, the High Power Consumption Communication Connected state, the Low Power Consumption Communication Connected state and the Not-In-Communication state. For example, the first communication state is the Low Power Consumption Communication Connected state, and the second communication state is the High Power Consumption Communication Connected state; or the first communication state is the Low Power Consumption Communication Connected state, and the second communication state is the Not-In-Communication state; or the first communication state is the Low Power Consumption Communication Requesting state, and the second communication state is the High Power Consumption Communication Connected state; or the first communication state is the High Power Consumption Communication Connected state, and the second communication state is the Low Power Consumption Communication Connected state etc.

After the electronic device is switched between two different postures, the processor 8 may adjust the electronic device from the first communication state to the second communication state. In a particular implementation, the first posture of the main body and the second posture of the main body may be any two different postures of the main body. The skilled in the art may select any one of the plurality of communication states as previously described as the first communication state, and select any another of the plurality of communication states as the second communication state, which are not particularly limited in the present disclosure.

It should be understood by the skilled in the art that in particular implementations, no matter whether the electronic device has three communication states, i.e., the Communication Connected state, the Not-In-Communication state and the Communication Requesting state, it falls into the protection scope of the claims and equivalents thereof in the present disclosure, as long as the first communication state and the second communication state are any two of the Communication Connected state, the Not-In-Communication state and the Communication Requesting state. Similarly, no matter whether the electronic device has five communication states, i.e., the Low Power Consumption Communication Connected state, the High Power Consumption Communication Connected state, the High Power Consumption Communication Requesting state, the Low Power Consumption Communication state and the Not-In-Communication state, it also falls into the protection scope of the claims and equivalents thereof in the present disclosure, as long as the first communication state and the second communication state are any two of the above five communication states. The present disclosure also intends to cover all these cases.

Figure 1B:
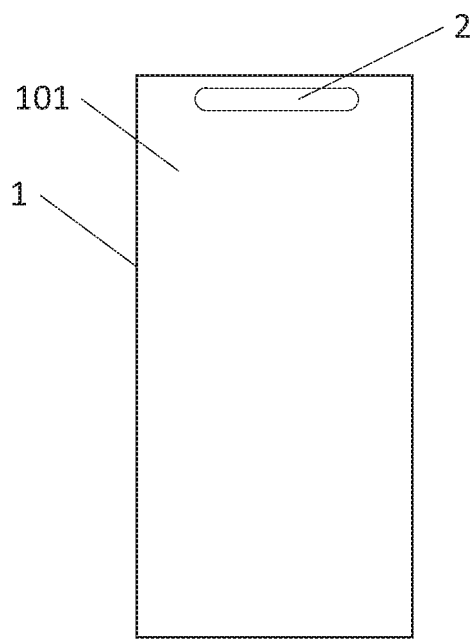
Figure 2:
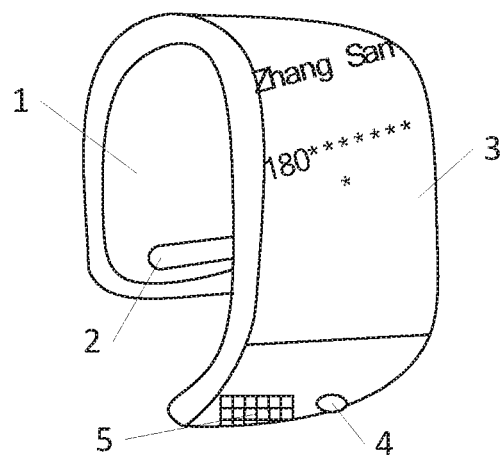
FIG. 2 is a schematic diagram of an electronic device in a maintaining posture according to an embodiment of the present disclosure.
Figure 4:
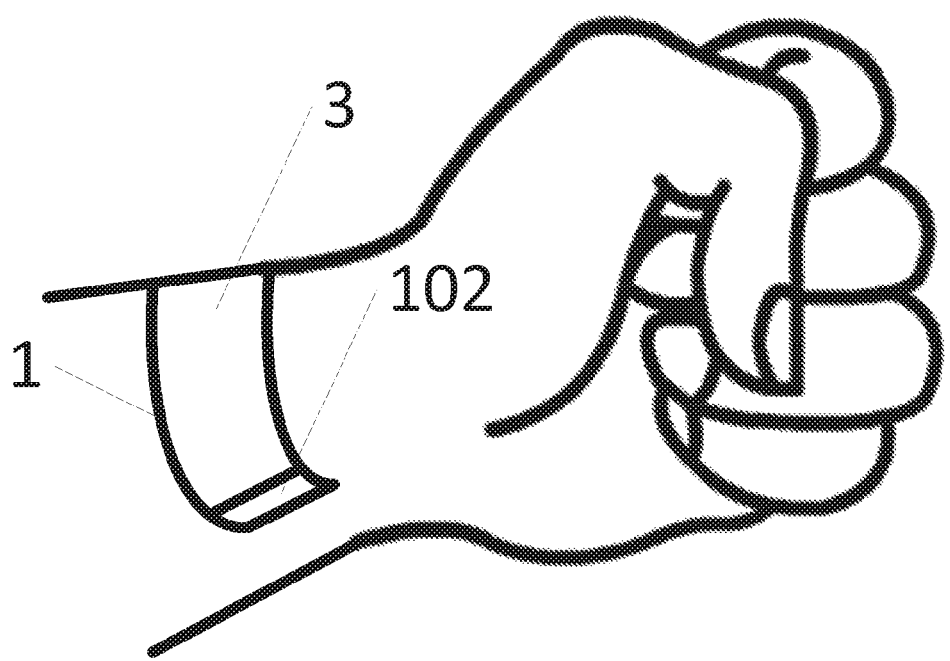
FIG. 4 is a schematic diagram of an electronic device which is fixed to at least a part of a user's body according to an embodiment of the present disclosure.

Further, in the embodiment of the present disclosure, the posture of the main body particularly includes a maintaining posture as shown in FIGS. 2 and 4 and a non-maintaining posture as shown in FIGS. 1A-1B. In particular implementations, the first posture of the main body may be the maintaining posture, and the second posture of the main body may be the non-maintaining posture; or the first posture of the main body may be the non-maintaining posture, and the second posture of the main body may be the maintaining posture, which are not limited in the present disclosure.

In particular, the user fixes the electronic device to at least one part of his body, such as his wrist, arm or head, by the main body 1. When the user wears the electronic device on at least one part of his body, the main body 1 is in the maintaining posture for maintaining a relative position relationship between the electronic device and the at least one part of the user's body. In the embodiment of the present disclosure, maintaining the relative position relationship between the electronic device and the at least one part of the user's body means maintaining the relative position relationship between the electronic device and the at least one part of the user's body unchanged or unchanged obviously. If the relative position relationship between the electronic device and the at least one part of the user's body is maintained not to be changed obviously, e.g., the user wears the electronic device on his head, the main body 1 maintains that the electronic device may not be dropped from the head.

In the embodiment of the present disclosure, when the main body 1 in the maintaining posture is worn on the at least one part of the user's body, the first outer surface 101 is particularly an outer surface attached to the at least one part of the user's body. Therefore, when the main body 1 is in the maintaining posture, the user may see the second outer face 102, but cannot see the first outer surface 101.

When the main body 1 is in the maintaining posture as shown in FIG. 2, the main body 1 can be at least one part of an annular space, or the main body 1 is at least one part of an approximately annular space which satisfies a first predetermined condition. The annular space or the approximately annular space may surround a periphery of a column which satisfies a second predetermined condition.

Figure 5A:
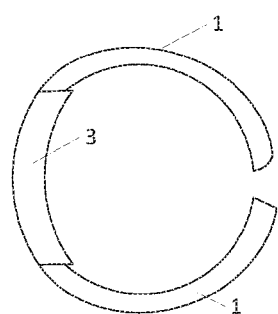
FIGS. 5A-5B are schematic lateral views of electronic devices in maintaining postures according to embodiments of the present disclosure.
Figure 5B:
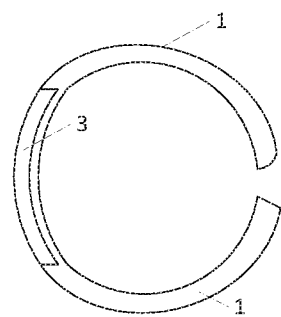

Particularly, when the main body 1 is a single entirety with a whole appearance, the display 3 is arranged around the second outer surface 102 as shown in FIG. 5A; or is fixed on the second outer surface 102 as shown in FIG. 5B. The main body 1 itself can form an approximately annular space or at least a part of an approximately annular space.

The approximately annular space satisfies a first predetermined condition, i.e., its diameter is smaller than that of the part of body on which the electronic device is worn, e.g., the diameter of the wrist. In this case, the wrist is regarded as a column. This column satisfies a second predetermined condition, i.e., its diameter is larger than that of the annular space. Further, if it is required to fix the electronic device with respect to some position or some height of the column, the diameter of the column should be smaller than that of the annular space.

In the embodiment of the present application, the maintaining posture and the non-maintaining posture may be switched mutually. Therefore, when the user does not need to fix the electronic device to at least a part of his body, the main body 1 may be switched from the maintaining posture to the non-maintaining posture.

Figure 6:
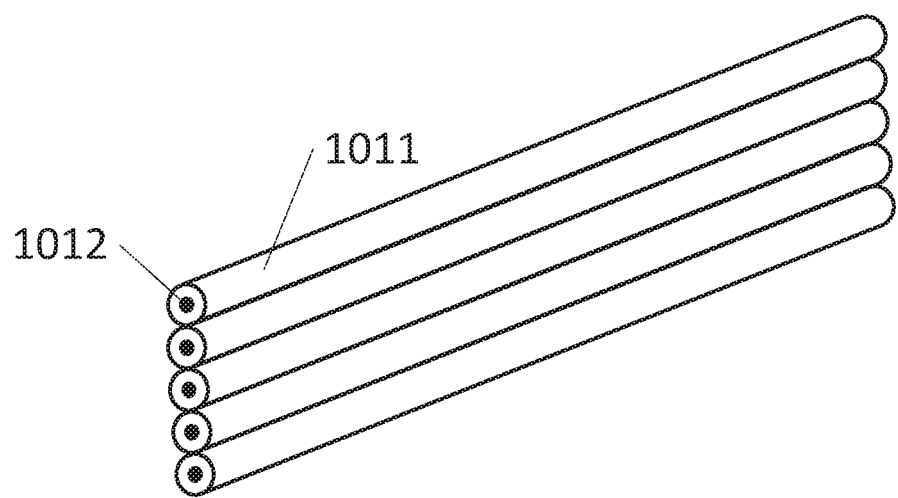
FIG. 6 is a schematic diagram of a flexible connector according to an embodiment of the present disclosure.

Particularly, the main body 1 has a flexible bending structure, in order to enable the electronic device to switch between the maintaining posture and the non-maintaining posture. In particular, as shown in FIG. 6, the flexible bending structure comprises:

a plurality of rotation members 1011, each of the plurality of rotation members having one rotation axis 1012 and capable of rotating around the rotation axis 1012 of its own.

In particular, in the embodiment of the present disclosure, the number of the rotation members 1011 is no less than 3. In particular implementations, the skilled in the art may set the number of the rotation members according to actual requirements, which is not particularly limited in the present disclosure.

The rotation axes 1012 of the plurality of rotation members 1011 are in parallel with each other. When a strength of a component of a force applied to one rotation member 1011 in a direction of being perpendicular to the rotation axis 1012 of its own and tangent to the outer surface of the rotation member 1011 satisfies a second preset condition, the rotation member 1011 may rotate around the rotation axis 1012 of its own. In the embodiment of the present disclosure, the second preset condition is that the strength of the component of the force is greater than a sum of a maximum static frictional force between the rotation member 1011 and the rotation axis 1012 of its own and a frictional force between adjacent two rotation members 1011. In the embodiment of the present disclosure, the force applied to the rotation member 1011 may be a force applied by the user, or may be forces transferred by other rotation members 1011. That is, one rotation member 1011 may be rotated by the force applied by the user, or may be driven by other rotation members 1011, which are not particularly limited in the present disclosure. In particular implementations, the sum of the maximum static frictional force between the rotation member 1011 and the rotation axis 1012 of its own and the frictional force between the adjacent two rotation members 1011 depends on manufacturing conditions, such as manufacturing materials, manufacturing processes, of the plurality of the rotation members 1011.

Further, in the embodiment of the present application, each rotation member 1011 is in contact with the two adjacent rotation members 1011. Therefore, when one rotation member 1011 is rotated, the adjacent two rotation members or the plurality of rotation members may also be driven in linkage, enabling the main body 1 to switch between the maintaining posture and the non-maintaining posture.

Further, in order to maintain the posture of the main body when the external force is not applied any more or the external force does not satisfy the second preset condition, there are specifically damping contacts between each rotation member 1011 and the adjacent two rotation members 1011. As such, the plurality of rotation members 1011 are kept stable mutually, so as to maintain the posture of the main body.

Figure 7:
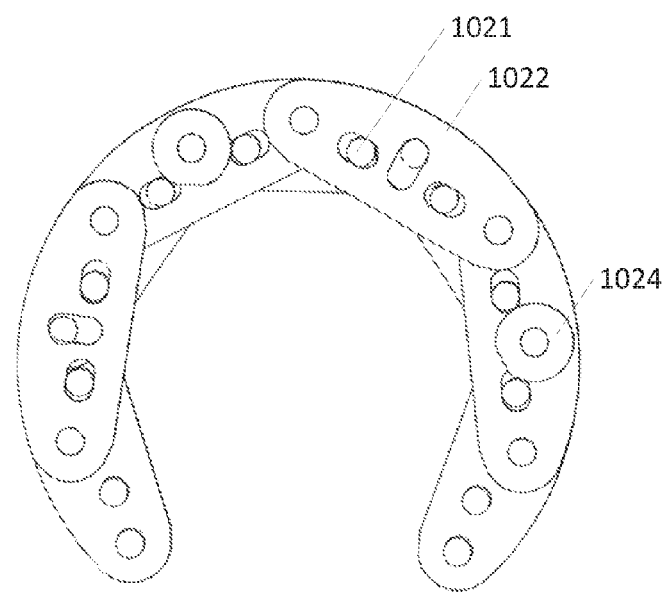
FIG. 7 is a schematic diagram of another flexible connector according to an embodiment of the present disclosure.
Figure 8:
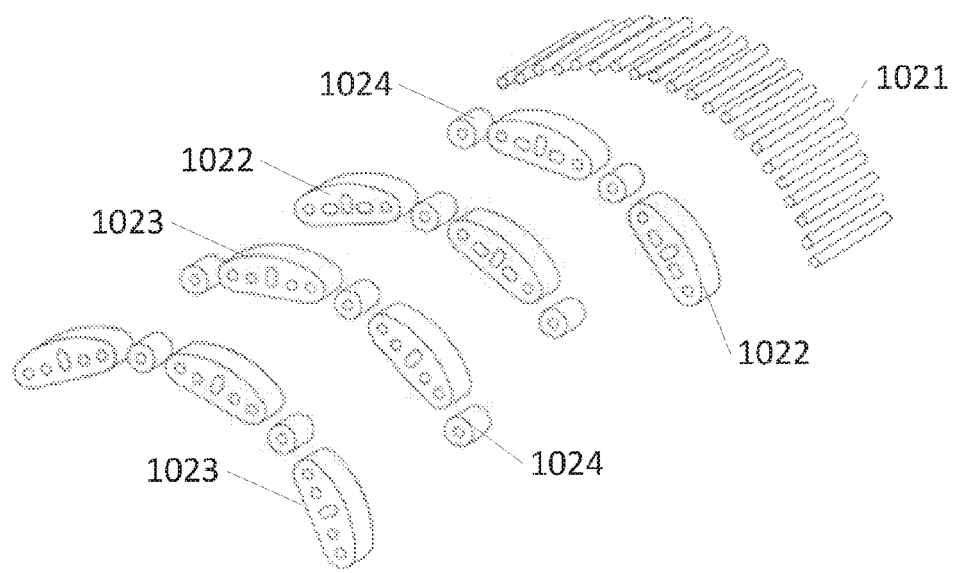
FIG. 8 is a structural schematic diagram of another flexible bending structure according to an embodiment of the present disclosure.

Alternatively, there is another implementation of the flexible bending structure as shown in FIGS. 7 and 8. Particularly, the flexible bending structure comprises:

a plurality of axes 1021, a plurality of first connecting member 1022, a plurality of second connecting member 1023 and a plurality of supporting member 1024.

Particularly, the number of the axes 1021 is at least 21. That is, when the 21 axes are flexibly bent, the main body 1 may change its posture, as shown in FIG. 7. The number of the axes may be chosen by the skilled in the art according to actual requirements, e.g., 84, 105 etc., which is not limited in the present disclosure. Hereinafter, 21 axes are taken as an example for convenience of illustration. Furthermore, as shown in FIG. 8, it is assumed that there are $1^{st}$ axis, $2^{nd}$ axis, . . . , and $21^{st}$ axis from up to down. Specific numbers of the first connecting members 1022, the second connecting members 1023 and the supporting members 1024 depend on the number of the axes, and may be repeated periodically in a connecting manner as described later in particular implementations.

Figure 9A:
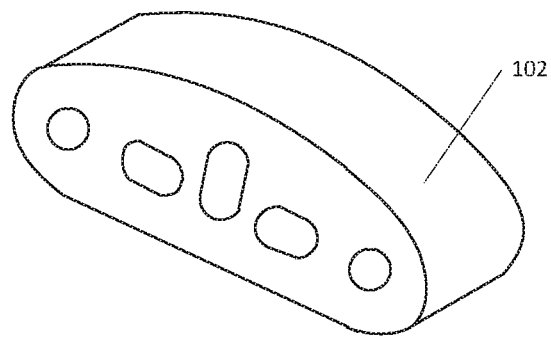
FIGS. 9A-9B are schematic diagrams of a first connecting member and a second connecting member according to embodiments of the present disclosure.

As shown in FIG. 9A, there are 5 through-holes arranged in the first connecting member 1022, and 5 axes may go through the 5 through-holes. There are 4 first connecting members 1022 included in each period. The $3^{rd}$ to $7^{th}$ axes go through the first connecting member 1022, the $7^{th}$ to $11^{th}$ axes go through the $2^{nd}$ first connecting member 1022, the $11^{th}$ to $15^{th}$ axis go through the $3^{rd}$ first connecting member 1022, and the $15^{th}$ to $19^{th}$ axes go through the $4^{th}$ first connecting member 1022. The $5^{th}$, $9^{th}$, $13^{th}$ and $17^{th}$ axes can rotate in corresponding through-holes, and can slide in a first direction. The $4^{th}$, $6^{th}$, $8^{th}$, $10^{th}$, $14^{th}$, $17^{th}$ and $18^{th}$ axes can rotate in corresponding through-holes, and can slide in a second direction. The first direction and the second direction are perpendicular to each other. The remaining axes can only rotate in corresponding through-holes in situ.

Figure 9B:
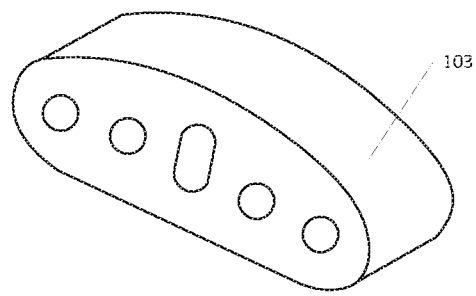

As shown in FIG. 9B, there are 5 through-holes arranged in the second connecting member 1023, and 5 axes may go through the 5 through-holes. There are 5 second connecting members 1023 included in each period. The $1^{st}$ to $5^{th}$ axes go through the $1^{st}$ second connecting member 1023, the $5^{th}$ to $9^{th}$ axes go through the $2^{nd}$ second connecting member 1023, the $9^{th}$ to $13^{th}$ axes go through the $3^{rd}$ second connecting member 1023, the $13^{th}$ to $17^{th}$ axis go through the $4^{th}$ second connecting member 1023, and the $17^{th}$ to $21^{th}$ axes go through the $5^{th}$ second connecting member 1023. The $3^{rd}$, $7^{th}$, $11^{th}$, $15^{th}$, and $19^{th}$ axes can rotate in corresponding through-holes, and can slide in a first direction. The remaining axes can only rotate in corresponding through-holes in situ.

The supporting member 1024 is a hollow cylinder whose inner diameter matches with an outer diameter of the axis 1021. There are 9 supporting members 1024 in each period, in which each axis 1021 going through the through-hole in a middle position of the first connecting member 1022 and/or the second connecting member 1023 is inserted, as shown in FIG. 8.

In such a structure as described above, when an external force is applied to the main body 1, the plurality of axes 1021 rotate in the through-holes of the first connecting member 1022 and the second connecting member 1023, and slide in the first direction and the second direction, so that the flexible bending structure may be bent flexibly, and thus the electronic device is enabled to be in the maintaining posture to be fixed to at least one part of the user's body. When the flexible bending structure is not bent flexibly, the main body 1 is in straightness, as shown in FIGS. 1A and 1B. In this case, the main body 1 cannot maintain the relative position relationship between the electronic device and the at least one part of the user's body, and thus is switched to the non-maintaining posture.

In particular implementations, any of the above two ways to implement the flexible bending structure may be chosen by the skilled in the art according to actual requirements, which is not limited in the present disclosure.

Particularly, in the embodiments of the present disclosure, there are a plurality of implementations for the electronic device of switching from the first communication state to the second communication state. Hereinafter, the implementations of switching from the first communication state to the second communication state will be illustrated in connection with examples and application scenarios. The particular implementations include, but not limited to, examples as follows.

First Implementation

In the first implementation, the processor 8 is used for switching between the Communication Connected/Disconnected states, if the posture of the main body is switched from the first posture of the main body to the second posture of the main body.

Particularly, switching between the Communication Connected/Disconnected states means that the electronic device switches from not establishing a communication connection with another electronic device to establishing the communication connection, i.e., from the Communication Requesting state to the Communication Connected state; or means that after the electronic device establishes a communication connection with another electronic device, the communication connection is disconnected, i.e., the electronic device switches from the Communication Connected state to the Not-In-Communication state.

Then, the user adjusts the main body 1 from the first posture of the main body to the second posture of the main body, and the electronic device may be switched between the Communication Connected/Disconnected states or may establish the communication connection for the user. Therefore, in the view of the user, switching between the Communication states may be performed by just adjusting the posture of the main body, which is not only convenient to be implemented, but also may save learning cost of learning methods of switching between the Communication Connected/Disconnected states in the conventional solutions.

Particularly, the above first implementation may include two implementations as follows.

Implementation 1.1

In Implementation 1.1, the processor 8 is configured to switch the electronic device from the Communication Requesting state to the Low Power Consumption Communication Connected state.

Particularly, the posture of the main body 1 includes the maintaining posture and the non-maintaining posture, as shown in FIGS. 1A-2. The descriptions of the maintaining posture and the non-maintaining posture may refer to the previous illustration, which will not be omitted here for simplicity. Furthermore, in Implementation 1.1, the first posture of the main body is particularly the maintaining posture, the second posture of the main body is the non-maintaining posture, the first communication state is the Communication Requesting state, and the second communication state is the Low Power Consumption Communication Connected state.

When the main body 1 is switched from the maintaining posture to the non-maintaining posture, the processor 8 switches the electronic device from the Communication Requesting state to the Low Power Consumption Communication Connected state. In addition, when the electronic device is in the Communication Requesting state, the display 3 will output the communication request prompt, e.g., displaying numbers, identifications of other electronic devices, or pictures of the users of the other electronic devices, in order to prompt the user. Also in particular implementations, the second audio output component 5 may further output a ring, and/or the vibrator may generate vibration to prompt the user, which may be set by the skilled in the art according to actual requirements, and are not particularly limited in the present disclosure.

For example, it is assumed that initially, the user fixes the electronic device to his left wrist, as shown in FIG. 4. When the electronic device receives a communication request from another electronic device, the number of the other electronic device is displayed on the display 3, and the second audio output component 5 prompts the communication request by a ring. If the user accepts the communication request, the user takes the main body 1 off from his left wrist by his right hand, and adjusts the main body 1 to the non-maintaining posture, as shown in FIGS. 1A and 1B. The processor 8 detects a variation of the posture of the main body by the first sensor 6, determines that the main body 1 is switched from the maintaining posture to the non-maintaining posture, and switches the electronic device from the Communication Requesting state to the Low Power Consumption Communication Connected state, so that the electronic device establishes a communication connection with the other electronic device which requests the communication. Since the first audio output component 2 is arranged on the second outer surface 102, the user may directly put the second outer surface close to the face and ear for communication with the other electronic device after the electronic device is taken off, without transferring the electronic device from his right hand to his left hand and turning the electronic device over in his palm.

Further, since the user may directly put the first outer surface 101 close to his face and ear for communication without turning the electronic device over or changing his hand to have the second outer surface 102 face toward his face and ear. Therefore, the risk of the electronic device sliding down to be damaged may be reduced.

Implementation 1.2

Particularly, the processor 8 is configured to switch the electronic device from the Low Power Consumption Communication Connected state to the Not-In-Communication state.

Particularly, the posture of the main body 1 includes the maintaining posture and the non-maintaining posture, as shown in FIGS. 1A-2. The descriptions of the maintaining posture and the non-maintaining posture may refer to the previous illustration, which will not be omitted here for simplicity. Furthermore, in Implementation 1.2, the first posture of the main body is the non-maintaining posture, the second posture of the main body is the maintaining posture, the first communication state is the Low Power Consumption Communication Connected state, and the second communication state is the Not-In-Communication state.

In Implementation 1.2, when the electronic device is switched from the non-maintaining posture to the maintaining posture, the processor 8 switches the electronic device from the Low Power Consumption Communication Connected state to the Not-In-Communication/Disconnected state. Therefore, when the user needs to disconnect the communication, he may adjust the electronic device from the non-maintaining posture to the maintaining posture to implement disconnection of the communication.

Stilling using the example in Implementation 1.1, the user holds the electronic device with his right hand for communication in the Low Power Consumption Communication Connected state. When the communication needs to be ended, the user re-wears the main body 1 back to his left wrist by his right hand. Then, the first sensor 6 detects that the posture of the main body is varied again, and the processor 8 determines that the main body 1 is switched from the non-maintaining posture to the maintaining posture, and in turn the communication is disconnected. Thus, the electronic device is switched from the Low Power Consumption Communication Connected state to the Not-In-Communication state.

Of course, in particular implementations, the user may switch to the Not-In-Communication state using other approaches. For example, the electronic device further comprises a third sensor configured to detect a second operation of the user on switching the electronic device from the Communication Connected state to the Not-In-Communication state. The third sensor may be e.g. a touch sensor or a key etc.

For example, assuming that the third sensor is the touch sensor, when the electronic device is in the Communication Connected state, if the touch screen detects a touch operation of an operator on a "Disconnect" virtual key area, the processor 8 switches the electronic device to the Not-In-Communication state.

Second Implementation

In the second implementation, the second communication state is the High Power Consumption Communication Connected state, while the first communication state may be the Low Power Consumption Communication Connected state, the Communication Requested state or the Communication Disconnected state, which are not particularly limited in the present disclosure.

Then, the user adjusts the main body 1 from the first posture of the main body to the second posture of the main body, and the user may switch the electronic device from the Low Power Consumption Communication Connected state to the High Power Consumption Communication Connected state, or from the Communication Requesting state to the High Power Consumption Communication Connected state, or from the Not-In-Communication state to the High Power Consumption Communication Connected state etc. Therefore, in the view of the user, the electronic device may be switched to the High Power Consumption Communication Connected state by just adjusting the posture of the main body, which is not only convenient to be implemented, but also may save the learning cost.

Particularly, the above second implementation may also include two implementations as follows.

Implementation 2.1

In Implementation 2.1, the electronic device comprises: a main body 1, a first audio output component 2, a display 3, an audio input component 4, a second audio output component 5, a first sensor 6, a communication component 7 and a processor 8. Besides the above components, the electronic device further comprises:

a second sensor 9 arranged on the main body 1 and connected to the processor 8, the second sensor 9 being configured to detect a first operation satisfying a first predetermined condition.

Particularly, there are a plurality of possibilities for the first predetermined condition. Therefore, there are a plurality of possibilities for the second sensor 9 and the first operation. Hereinafter, two of the plurality of possibilities will be introduced. Of course in particular implementations, the present disclosure is not limited to these two possibilities.

First: the first predetermined condition is a touch operation in a process of adjusting the posture of the main body. Then, the first operation is the touch operation in adjusting the posture of the main body. The second sensor 9 is the touch-sensitive screen.

Second: the first predetermined condition is that a power key is clicked in the process of adjusting the posture of the main body or within a preset time period before and after the posture of the main body is switched. The preset time period is e.g. 500 ms, 0.9 s etc., which is not particularly limited in the present disclosure. Then, the first operation is clicking the power key in the process of adjusting the posture of the main body, or clicking the power key within the preset time period before and after the posture of the main body is switched. The second sensor 9 is a pressure sensor connected to the power key.

When the second sensor 9 detects the first operation satisfying the first predetermined condition, the processor 8 switches the electronic device from the Low Power Consumption Communication Connected state to the High Power Consumption Communication Connected state, wherein the first posture of the main body is the non-maintaining posture, and the second posture of the main body is the maintaining posture.

Particularly in Implementation 2.1, the posture of the main body 1 includes the maintaining posture and the non-maintaining posture, as shown in FIGS. 1A-2. The descriptions of the maintaining posture and the non-maintaining posture may refer to the previous illustration, which will not be omitted here for simplicity. Furthermore, in Implementation 2.1, the first posture of the main body is particularly the maintaining posture, the second posture of the main body is the non-maintaining posture, the first communication state is the Low Power Consumption Communication Connected state, and the second communication state is the High Power Consumption Communication Connected state.

Stilling using the example in Implementation 1.1, the user holds the electronic device with his right hand for communication in the Low Power Consumption Communication Connected state. It is assumed that the first preset condition is the touch operation in the process of adjusting the posture of the main body. When the user does not want to continue the communication with the first outer surface 101 arranged close to his face and ear, the user re-fixes the main body 1 back to his left wrist with his right hand. Further, the first sensor 6 detects that the posture of the main body is varied again, the processor 8 determines that the main body 1 is switched from the non-maintaining posture to the maintaining posture. Simultaneously, during the electronic device is worn to the left wrist, the user clicks the touch-sensitive screen, and thus the touch-sensitive screen detects the first operation satisfying the first predetermined condition. Therefore, in the case that the main body 1 is switched from the non-maintaining posture to the maintaining posture and the first operation is performed, the processor 8 adjusts the electronic device from the Low Power Consumption Communication Connected state to the High Power Consumption Communication Connected state.

As seen from the above, when the user needs to enable the electronic device to output the voices from the other electronic devices by the second audio output component 5, it may be implemented by adjusting the main body 1 from the non-maintaining posture to the maintaining posture while performing the first operation satisfying the first predetermined condition.

As known from the above, in Implementation 1.2, after the main body 1 is switched from the non-maintaining posture to the maintaining posture, the electronic device is switched from the Low Power Consumption Communication Connected state to the Not-In-Communication state; while in Implementation 2.1, after the main body 1 is switched from the non-maintaining posture to the maintaining posture and the first operation is detected, the electronic device is switched from the Low Power Consumption Communication Connected state to the High Power Consumption Communication Connected state. Therefore, in particular implementations, the skilled in the art may use Implementation 1.2 or Implementation 2.1 or both of Implementation 1.2 and Implementation 2.1, and may set the electronic device to determine according to the first operation whether the electronic device is switched to the Low Power Consumption Communication Connected state or the Not-In-Communication state when the main body 1 is switched from the non-maintaining posture to the maintaining posture, which are not particularly limited in the present disclosure.

Implementation 2.2

In Implementation 2.2, the processor 8 is configured to switch the electronic device from the Communication Requesting state to the High Power Consumption Communication Connected state.

Particularly, the posture of the main body 1 includes the maintaining posture and the non-maintaining posture, as shown in FIGS. 1A-2. The descriptions of the maintaining posture and the non-maintaining posture may refer to the previous illustration, which will not be omitted here for simplicity. Furthermore, in Implementation 2.2, the first posture of the main body is the non-maintaining posture, the second posture of the main body is the maintaining posture, the first communication state is the Communication Requesting state, and the second communication state is the High Power Consumption Communication Connected state.

When the main body 1 is switched from the maintaining posture to the non-maintaining posture, the processor 8 switches the electronic device from the Communication Requesting state to the High Power Consumption Communication Connected state. In addition, when the electronic device is in the Communication Requesting state, the display 3 will output the communication request prompt, e.g., displaying numbers, identifications of other electronic devices, or pictures of the users of the other electronic devices, in order to prompt the user. Also in particular implementations, the second audio output component 5 may further output a ring, and/or the vibrator may generate vibration to prompt the user, which may be set by the skilled in the art according to actual requirements, and are not particularly limited in the present disclosure.

For example, it is assumed that initially, the user holds the electronic device in the non-maintaining posture in his right hand and the second outer surface 102 faces toward his palm. When the electronic device receives a communication request from another electronic device, the number of the other electronic device is displayed on the display 3, and the second audio output component 5 prompts the communication request by a ring. If the user accepts the communication request, the user wears the main body 1 to his left wrist by his right hand. Further, the first sensor 6 detects the variation of the posture of the main body; the processor 8 determines that the main body 1 is switched from the non-maintaining posture to the maintaining posture, and then establishes a communication connection and switches the electronic device from the Communication Requesting state to the High Power Consumption Communication Connected state.

Third Implementation

In the third implementation, the processor 8 is used for switching the electronic device from the High Power Consumption Communication Requesting state to the Low Power Consumption Communication Requesting state.

Particularly, the posture of the main body 1 includes the maintaining posture and the non-maintaining posture, as shown in FIGS. 1A-2. The descriptions of the maintaining posture and the non-maintaining posture may refer to the previous illustration, which will not be omitted here for simplicity. Furthermore, in the third implementation, the first posture of the main body is particularly the maintaining posture, the second posture of the main body is the non-maintaining posture, the first communication state is the High Power Consumption Communication Requesting state, and the second communication state is the Low Power Consumption Communication Requesting state.

For example, it is assumed that initially, the user fixes the electronic device to his left wrist, as shown in FIG. 4. After the electronic device receives a communication request from another electronic device, the electronic device is in the High Power Consumption Communication Requesting state. The communication number is displayed by the display 3, and the second audio output component 5 outputs ring and the vibrator vibrates so as to prompt the user. Assuming that the user does not want the electronic device to ring and vibrate at this time, the user may take the main body 1 off from his left wrist by his right hand and adjusts the main body 1 to the non-maintaining posture, as shown in FIGS. 1A and 1B. The processor 8 detects the variation of the posture of the main body by the first sensor 6, determines that the main body 1 is switched from the maintaining posture to the non-maintaining posture, and switches the electronic device from the High Power Consumption Communication Requesting state to the Low Power Consumption Communication Requesting state, so as to enable the electronic device to prompt the communication request only by displaying.

Fourth Implementation

In the fourth implementation, the electronic device further comprises a deformation trigger connected to the communication component and the processor 8. The deformation trigger is configured to trigger the main body 1 from the second posture of the main body to deform to the first posture of the main body, when the electronic device receives the communication request from another electronic device. In the fourth implementation, if the posture of the main body is switched from the first posture of the main body back to the second posture of the main body, or to the third posture of the main body, the processor 8 is configured to switch the electronic device from the first communication state to the second communication component.

Figure 10:
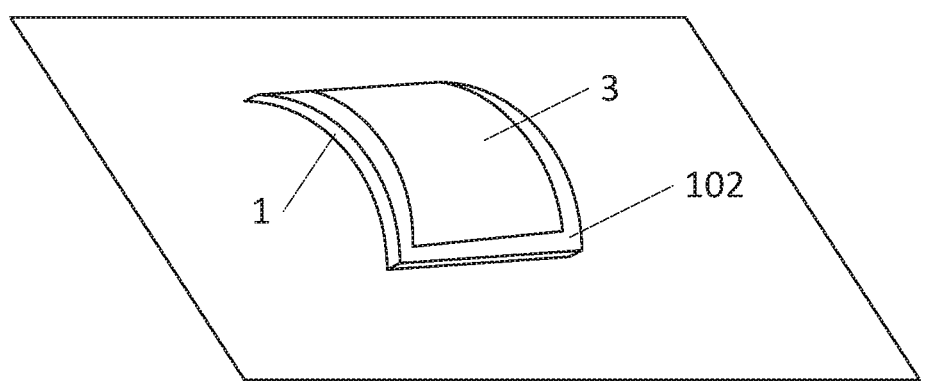
FIG. 10 is a schematic diagram of an electronic device in a bent posture according to an embodiment of the present disclosure.

Particularly, in the fourth implementation, the second posture of the main body is a bar posture, and the first posture of the main body is a bent posture, as shown in FIG. 10. The third posture of the main body is a slightly-bent posture whose curvature is between that of the bent posture and that of the bar posture.

In the embodiment of the present disclosure, if the posture of the main body is switched from the first posture of the main body back to the second posture of the main body or to the third posture of the main body, switching from the first communication state to the second communication state may also be performed among any two of the plurality of communication states as previously described. Hereinafter, three of implementations will be described as examples.

Implementation 4.1

In Implementation 4.1, the processor 8 is used for switching the electronic device from the High Power Consumption Communication Requesting state to the Low Power Consumption Communication Requesting state.

Particularly in Implementation 4.1, the first posture of the main body is the bent posture as shown in FIG. 10, and the second posture of the main body is the bar posture. The first communication state is the High Power Consumption Communication Requesting state, and the second communication state is the Low Power Consumption Communication Requesting state.

For example, the electronic device is placed on a placing plane as shown in FIG. 10. When the communication request from another electronic device is received, the main body 1 is bent to deform to the bent posture. At this time, the electronic device is in the High Power Consumption Communication Requesting state. The communication number is displayed by the display 3, and the second audio output component 5 outputs ring and the vibrator vibrates so as to prompt the user. Assuming that the user is having a meeting, he hopes to adjust the electronic device to the Low Power Consumption Communication Requesting state. Thus, the user presses the main body 1 to adjust the main body 1 from the bent posture to the bar posture. The processor 8 determines that the main body 1 is switched from the bent posture to the bar posture, and switches the electronic device to the Low Power Consumption Communication Requesting state, so that the electronic device may only display the communication number by the display.

Implementation 4.2

In Implementation 4.2, the processor 8 is used for switching the electronic device from the Communication Requesting state to the Not-In-Communication state.

Particularly in Implementation 4.2, the first posture of the main body is the bent posture as shown in FIG. 10, and the third posture of the main body is the slightly-bent posture. The first communication slate is the Communication Requesting state, and the second communication state is the Not-In-Communication state.

For example, the electronic device is placed on a placing plane as shown in FIG. 10. When the communication request from another electronic device is received, the main body 1 is bent to deform to the bent posture. At this time, the electronic device is in the High Power Consumption Communication Requesting state. The communication number is displayed by the display 3, and the second audio output component 5 outputs ring and the vibrator vibrates so as to prompt the user. Assuming that the user is having a meeting, he needs to reject the communication request. Thus, the user slightly presses the main body 1 to adjust the main body 1 from the bent posture to the slightly-bent posture. The processor 8 determines that the main body 1 is switched from the bent posture to the slightly-bent posture, and switches the electronic device to the Not-In-Communication state, so as to reject the communication request.

Implementation 4.3

In Implementation 4.3, the processor 8 is used for switching the electronic device from the Communication Requesting state to the Not-In-Communication state.

Particularly in Implementation 4.3, the first posture of the main body is the bent posture as shown in FIG. 10, and the third posture of the main body is the bar posture. The first communication state is the Communication Requesting state, and the second communication state is the Not-In-Communication state.

For example, the electronic device is placed on a placing plane as shown in FIG. 10. When the communication request from another electronic device is received, the main body 1 is bent to deform to the bent posture. At this time, the electronic device is in the High Power Consumption Communication Requesting state. The communication number is displayed by the display 3, and the second audio output component 5 outputs ring and the vibrator vibrates so as to prompt the user. Assuming that the user is having a meeting, he needs to reject the communication request. Thus, the user presses the main body 1 to adjust the main body 1 from the bent posture to the bar posture. The processor 8 determines that the main body 1 is switched from the bent posture to the bar posture, and switches the electronic device to the Not-In-Communication state, so as to reject the communication request.

In particular implementations, the skilled in the art may randomly set the first communication state and the second communication state and relationships between the first communication state, the second communication state and the first posture of the main body and the second posture of the main body according to practical requirements, which are not particularly limited in the present disclosure.

Alternatively, since the electronic device in the embodiments of the present disclosure may be switched from the first posture of the main body to the second posture of the main body, the display 3 may be switched from a posture matched with the first posture of the main body to a posture matched with the second posture of the main body when the main body 1 is switched from the first posture of the main body to the second posture of the main body, in order to follow the variation of the posture of the main body to facilitate the user to view the display content.

For example, the first posture of the main body is the maintaining posture, and the second posture of the main body is the non-maintaining posture. Then, when the main body 1 is switched from the maintaining posture to the non-maintaining posture, the display 3 may be switched from the bent posture to a bar posture following the adjustment of the posture of the main body. On the contrary, when the main body 1 is switched from the non-maintaining posture to the maintaining posture, the display 3 is switched from the bar posture back to the bent posture, either.

Specifically, in particular implementations, the display screen of the display 3 may be set as a flexible screen, and the flexible screen may adjust its own posture following the posture of the main body 1; alternatively, the display 3 may also be set as a folded screen, which is not limited in the present disclosure.

Figure 11:
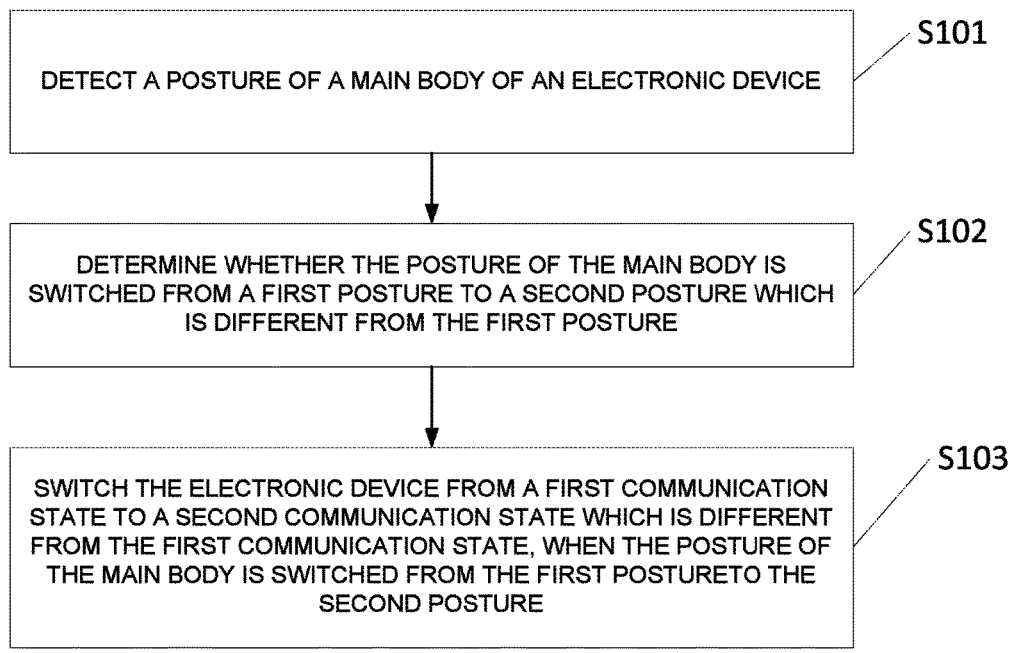
FIG. 11 is an illustrative flowchart of an information processing method according to an embodiment of the present disclosure.

Based on the same idea as the electronic device in the embodiments as previously described, a second aspect of the present disclosure further provides an information processing method, as shown in FIG. 11, comprising:

S101 of detecting a posture of a main body of an electronic device;

S102 of determining whether the posture of the main body is switched from a first posture of the main body to a second posture of the main body which is different from the first posture of the main body; and S103 of switching the electronic device from a first communication state to a second communication state which is different from the first communication state, if the posture of the main body is switched from the first posture of the main body to the second posture of the main body.

In the embodiment of the present disclosure, there are a plurality of implementations of S103, some of which are illustrated as examples as follows.

First Implementation

A particular implementation of S103 comprises:

switching between Communication Connected/Disconnected states, if the posture of the main body is switched from the first posture of the main body to the second posture of the main body.

Particularly, switching between the Communication Connected/Disconnected states comprises:

switching the electronic device from a Communication Requesting state to a Low Power Consumption Communication Connected state; and the Low Power Consumption Communication Connected state is a state in which a voice input of a first communication party is collected by the audio input component and voices from other electronic devices are output by the first audio output component; wherein the first posture of the main body is a maintaining posture, and the second posture of the main body is a non-maintaining posture;

wherein the postures of the main body comprise the maintaining posture and the non-maintaining posture; and when the main body is in the maintaining posture, the main body maintains a relative position relationship of the electronic device with respect to at least a part of a user's body, and the main body can be at least a part of an annular space or at least a part of an approximately annular space which satisfies a first predetermined condition; and wherein a communication requesting prompt is output when the electronic device is in the Communication Requesting state.

Alternatively, switching between the Communication Connected/Disconnected states comprises:

switching the electronic device from a Low Power Consumption Communication Connected state to a Communication-Disconnected state; and the Low Power Consumption Communication Connected state is a state in which a voice input of a first communication party is collected by the audio input component and voices from other electronic devices are output by the first audio output component; wherein the first posture of the main body is a non-maintaining posture, and the second posture of the main body is a maintaining posture; and wherein the postures of the main body comprise the maintaining posture and the non-maintaining posture; and when the main body is in the maintaining posture, the main body can be at least a part of an annular space or at least a part of an approximately annular space which satisfies a first predetermined condition.

Second Implementation

The second communication state is the High Power Consumption Communication Connected state.

Particularly, a particular implementation of S103 comprises:

determining whether a first operation which satisfies a first predetermined condition detected;

switching the electronic device from the Low Power Consumption Communication Connected state to the High Power Consumption Communication Connected state, if the first operation is detected; wherein the first posture of the main body is a non-maintaining posture, and the second posture of the main body is a maintaining posture; and the postures of the main body comprise the maintaining posture and the non-maintaining posture; when the main body is in the maintaining posture, the main body can be at least a part of an annular space or at least a part of an approximately annular space which satisfies a first predetermined condition.

Alternatively, a particular implementation of S103 comprises:

switching the electronic device from the first communication state to the second communication state which is different from the first communication state if the posture of the main body is switched from the first posture of the main body to the second posture of the main body comprises:

switching the electronic device from the Communication Requesting state to the High Power Consumption Communication Connected state; wherein the first posture of the main body is a non-maintaining posture, and the second posture is a maintaining posture; and the postures of the main body comprise the maintaining posture and the non-maintaining posture; when the main body is in the maintaining posture, the main body can be at least a part of an annular space or at least a part of an approximately annular space which satisfies a first predetermined condition; and outputting a communication requesting prompt when the electronic device is in the Communication Requesting state.

Various variations and specific implementations of the electronic device in the embodiments with reference to FIGS. 1A-10 as previously described may also apply to the information processing method in the present embodiment. By the detailed description on the electronic device as described above, the skilled in the art may clearly learn implementations of the information processing method in the present embodiment. Therefore, the description on the information processing method will be omitted here for simplicity.

The above one or more technical solutions in the embodiments of the present disclosure have at least one or more technical effects as follows.

In the technical solutions according to the embodiments of the present disclosure, the first audio output component of the electronic device is arranged on the first outer surface of the main body, the display is arranged on the second outer surface, and the audio input component is arranged on the main body. The first outer surface and the second outer surface are opposite to each other. As such, by respectively arranging the first audio output component and the display on the two opposite outer surfaces, the electronic device is more convenient to be used.

It can be appreciated by those skilled in the art that the embodiments of the present disclosure can be implemented as a method, a system or a computer program product. The present disclosure may include pure hardware embodiments, pure software embodiments and any combination thereof.

Also, the present disclosure may include a computer program product implemented on one or more computer readable storage medium (including, but not limited to, magnetic disk storage, CD-ROM, optical storage) containing computer readable program codes.

The present disclosure have been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

In particular, computer program instructions corresponding to the information processing method in the embodiments of the present disclosure may be stored in a storage medium such as an optical disk, a hard disk, a U-disk etc. When the computer program instructions in the storage medium corresponding to the first information processing method are read or executed by an electronic device, there are steps as follows included:

detecting a posture of a main body of an electronic device;

determining whether the posture of the main body is switched from a first posture of the main body to a second posture of the main body which is different from the first posture of the main body; and switching the electronic device from a first communication state to a second communication state which is different from the first communication state, if the posture of the main body is switched from the first posture of the main body to the second posture of the main body.

Alternatively, during the computer instructions stored in the storage medium are particularly executed, wherein the computer instructions are corresponding to the step of switching the electronic device from the first communication state to the second communication state which is different from the first communication state if the posture of the main body is switched from the first posture of the main body to the second posture of the main body, there are steps as follows particularly included:

switching between Communication Connected/Disconnected states, if the posture of the main body is switched from the first posture of the main body to the second posture of the main body.

Alternatively, the second communication state is a High Power Consumption Communication Connected state; and the High Power Consumption Communication Connected stare is a state in which a voice input of a first communication party is collected by the audio input component and a voice from another electronic device is output by the second audio output component.

Alternatively, during the computer instructions stored in the storage medium are particularly executed, wherein the computer instructions are corresponding to the step of switching between the Communication Connected/Disconnected states, there are steps as follows particularly included:

switching the electronic device from a Communication Requesting state to a Low Power Consumption Communication Connected state; and the Low Power Consumption Communication Connected state is a state in which a voice input of a first communication party is collected by the audio input component and voices from other electronic devices are output by the first audio output component; wherein the first posture of the main body is a maintaining posture, and the second posture of the main body is a non-maintaining posture;

wherein the postures of the main body comprise the maintaining posture and the non-maintaining posture; and when the main body is in the maintaining posture, the main body maintains a relative position relationship of the electronic device with respect to at least a part of a user's body, and the main body can be at least a part of an annular space or at least a part of approximately annular space which satisfies a first predetermined condition; and wherein a communication requesting prompt is output when the electronic device is in the Communication Requesting state.

Alternatively, during the computer instructions stored in the storage medium are particularly executed, wherein the computer instructions are corresponding to the step of switching between the Communication Connected/Disconnected states, there are steps as follows particularly included:

switching the electronic device from a Low Power Consumption Communication Connected state to a Not-In-Communication state; and the Low Power Consumption Communication Connected state is a state in which a voice input of a first communication party is collected by the audio input component and voices from other electronic devices are output by the first audio output component; wherein the first posture of the main body is a non-maintaining posture, and the second posture of the main body is a maintaining posture; and wherein the postures of the main body comprise the maintaining posture and the non-maintaining posture; and when the main body is in the maintaining posture, the main body maintains a relative position relationship of the electronic device with respect to at least a part of a users body, and the main body can be at least a part of an annular space or at least a part of approximately annular space which satisfies a first predetermined condition.

Alternatively, during the computer instructions stored in the storage medium are particularly executed, wherein the computer instructions are corresponding to the step of switching the electronic device from the first communication state to the second communication state which is different from the first communication state if the posture of the main body is switched from the first posture of the main body to the second posture of the main body, there are steps as follows particularly included:

determining whether a first operation which satisfies a first predetermined condition is detected;

switching the electronic device from the Low Power Consumption Communication Connected state to the High Power Consumption Communication Connected state, if the first operation is detected; wherein the first posture of the main body is a non-maintaining posture, and the second posture of the main body is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of approximately annular space which satisfies a first predetermined condition.

Alternatively, during the computer instructions stored in the storage medium are particularly executed, wherein the computer instructions are corresponding to the step of switching the electronic device from the first communication state to the second communication state which is different from the first communication state if the posture of the main body is switched from the first posture of the main body to the second posture of the main body, there are steps as follows particularly included:

switching the electronic device from the Communication Requesting state to the High Power Consumption Communication Connected state; wherein the first posture of the main body is a non-maintaining posture, and the second posture of the main body is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of approximately annular space which satisfies a first predetermined condition; and outputting a communication requesting prompt when the electronic device is in the Communication Requesting state.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

We claim:

1. An electronic device, comprising:
a main body;
a first audio output component arranged on a first outer surface of the main body;
a display arranged on a second outer surface of the main body, the first outer surface and the second outer surface being arranged on opposite sides of the main body;
an audio input component arranged on the main body;
a second audio output component arranged on the main body, wherein an attribute parameter of the second audio output component is higher than that of the first audio output component.

2. The electronic device according to claim 1, further comprising:
a first sensor, arranged on the main body and configured to detect a posture of the main body;
a communication component, arranged on the main body and configured to communicate with other electronic devices; and
a processor, arranged on the main body and connected to the first sensor, the communicator, the first audio output component, the display, the audio input component and the second audio output component, the processor being configured to:
determine whether the posture of the main body is switched from a first posture of the main body to a second posture of the main body which is different from the first posture of the main body, and
switch the electronic device from a first communication state to a second communication state which is different from the first communication state if the posture of the main body is switched from the first posture of the main body to the second posture of the main body.

3. The electronic device according to claim 2, wherein the first communication state and the second communication state are any two of a Communication Connected state, a Not-In-Communication state and a Communication Requesting state; or
the first communication state and the second communication state are any two of a Low Power Consumption Communication Requesting state, a High Power Consumption Communication Requesting state, a High Power Consumption Communication Connected state, a Low Power Consumption Communication Connected state and a Not-In-Communication state.

4. The electronic device according to claim 2, wherein the postures of the main body comprise a maintaining posture and a non-maintaining posture which is different from the maintaining posture; and
wherein when the main body is in the maintaining posture, the main body maintains a relative position relationship of the electronic device with respect to at least a part of a user's body, and the main body can be at least a part of an annular space or at least a part of an approximately annular space which satisfies a first predetermined condition.

5. The electronic device according to claim 2, wherein the processor is configured to switch between Communication Connected/Disconnected states, if the posture of the main body is switched from the first posture of the main body to the second posture of the main body.

6. The electronic device according to claim 2, wherein the second communication state is a High Power Consumption Communication Connected state; and the High Power Consumption Communication Connected state is a state in which a voice input of a first communication party is collected by the audio input component and voices from said other electronic devices are output by the second audio output component.

7. The electronic device according to claim 5, wherein the processor is configured to switch the electronic device from a Communication Requesting state to a Low Power Consumption Communication Connected state; and the Low Power Consumption Communication Connected state is a state in which a voice input of a first communication party is collected by the audio input component and voices from said other electronic devices are output by the first audio output component; wherein the first posture of the main body is a maintaining posture, and the second posture of the main body is a non-maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition; and
the display is further configured to output a communication requesting prompt when the electronic device is in the Communication Requesting state.

8. The electronic device according to claim 5, wherein the processor is configured to switch the electronic device from a Low Power Consumption Communication Connected state to a Not-In-Communication state; and the Low Power Consumption Communication Connected state is a state in which a voice input of a first communication party is collected by the audio input component and voices from said other electronic devices are output by the first audio output component; wherein the first posture of the main body is a non-maintaining posture, and the second posture of the main body is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition.

9. The electronic device according to claim 6, further comprising:
a second sensor arranged on the main body and connected to the processor, the second sensor being configured to detect a first operation which satisfies a first predetermined condition; and
wherein the processor is configured to switch the electronic device from the Low Power Consumption Communication Connected state to the High Power Consumption Communication Connected state, if the second sensor detects the first operation; wherein the first posture of the main body is a non-maintaining posture, and the second posture of the main body is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition.

10. The electronic device according to claim 6, wherein the processor is configured to switch the electronic device from the Communication Requesting state to the High Power Consumption Communication Connected state; wherein the first posture of the main body is a non-maintaining posture, and the second posture of the main body is a maintaining posture; and the postures of the main body comprise the maintaining posture and the non-maintaining posture; when the main body is in the maintaining posture, the main body maintains a relative position relationship of the electronic device with respect to at least a part of a user's body, and the main body can be at least a part of an annular space or at least a part of an approximately annular space which satisfies a first predetermined condition; and the display is further configured to output a communication requesting prompt when the electronic device is in the Communication Requesting state.

11. The electronic device according to claim 2, wherein the display can be switched from a posture matched with the first posture of the main body to a posture matched with the second posture of the main body, if the posture of the main body is switched from the first posture of the main body to the second posture of the main body.

12. An information processing method, comprising:
detecting a posture of a main body of an electronic device;
determining whether the posture of the main body is switched from a first posture of the main body to a second posture of the main body which is different from the first posture of the main body; and
switching the electronic device from a first communication state to a second communication state which is different from the first communication state, if the posture of the main body is switched from the first posture of the main body to the second posture of the main body,
wherein the postures of the main body comprise a maintaining posture and a non-maintaining posture which is different from the maintaining posture; and
wherein when the main body is in the maintaining posture, the main body maintains a relative position relationship of the electronic device with respect to at least a part of a user's body, and the main body can be at least a part of an annular space or at least a part of an approximately annular space which satisfies a first predetermined condition.

13. The method according to claim 12, wherein switching the electronic device from the first communication state to the second communication state which is different from the first communication state if the posture of the main body is switched from the first posture of the main body to the second posture of the main body comprises:
switching between Communication Connected/Disconnected states, if the posture of the main body is switched from the first posture of the main body to the second posture of the main body.

14. The method according to claim 12, wherein the second communication state is a High Power Consumption Communication Connected state; and the High Power Consumption Communication Connected state is a state in which a voice input of a first communication party is collected by the audio input component and voices from other electronic devices are output by the second audio output component.

15. The method according to claim 13, wherein switching between the Communication Connected/Disconnected states, comprises:
switching the electronic device from a Communication Requesting state to a Low Power Consumption Communication Connected state; and the Low Power Consumption Communication Connected state is a state in which a voice input of a first communication party is collected by the audio input component and voices from other electronic devices are output by the first audio output component; wherein the first posture of the main body is the maintaining posture, and the second posture of the main body is the non-maintaining posture; and
wherein a communication requesting prompt is output when the electronic device is in the Communication Requesting state.

16. The method according to claim 13, wherein switching between the Communication Connected/Disconnected states comprises:
switching the electronic device from a Low Power Consumption Communication Connected state to a Not-In-Communication state; and the Low Power Consumption Communication Connected state is a state in which a voice input of a first communication party is collected by the audio input component and voices from other electronic devices are output by the first audio output component; wherein the first posture of the main body is the non-maintaining posture, and the second posture of the main body is the maintaining posture.

17. The method according to claim 14, wherein switching the electronic device from the first communication state to the second communication state which is different from the first communication state if the posture of the main body is switched from the first posture of the main body to the second posture of the main body comprises:
determining whether a first operation which satisfies the first predetermined condition is detected; and
switching the electronic device from the Low Power Consumption Communication Connected state to the High Power Consumption Communication Connected state, if the first operation is detected; wherein the first posture of the main body is the non-maintaining posture, and the second posture of the main body is the maintaining posture.

18. The method according to claim 14, wherein switching the electronic device from the first communication state to the second communication state which is different from the first communication state if the posture of the main body is switched from the first posture of the main body to the second posture of the main body comprises:
switching the electronic device from the Communication Requesting state to the High Power Consumption Communication Connected state; wherein the first posture of the main body is the non-maintaining posture, and the second posture of the main body is the maintaining posture; and
outputting a communication requesting prompt when the electronic device is in the Communication Requesting state.

* * * * *